United States Patent [19]

Szentesi

[11] 4,145,110
[45] Mar. 20, 1979

[54] OPTICAL FIBRE CONNECTOR FOR VARIABLE SIGNAL ATTENUATION

[75] Inventor: Otto I. Szentesi, Ottawa, Canada

[73] Assignee: Northern Telecom Limited, Montreal, Canada

[21] Appl. No.: 785,776

[22] Filed: Apr. 8, 1977

[51] Int. Cl.² .............................................. G02B 5/14
[52] U.S. Cl. ............................................ 350/96.15
[58] Field of Search ................................. 350/96 C

[56] References Cited

U.S. PATENT DOCUMENTS

| 3,972,585 | 8/1976 | Dalgleish et al. | 350/96 C |
| 4,021,099 | 5/1977 | Kawasaki et al. | 350/96 C |
| 4,027,938 | 6/1977 | Lewis | 350/96 C |
| 4,068,952 | 1/1978 | Erbert | 350/96.16 |

FOREIGN PATENT DOCUMENTS 2034344  1/1972  Fed. Rep. of Germany ........ 350/96 C Primary Examiner—Rolf G. Hille
Attorney, Agent, or Firm—Sidney T. Jelly

[57] ABSTRACT

An optical fibre connector is disclosed for variable optical signal attenuation. The attenuator comprises a connecting element with a common bore of size to accept with close sliding fit two optical fibres in end to end relationship, and a positioning means for varying the end separation of said optical fibres relative to one another.

1 Claim, 7 Drawing Figures

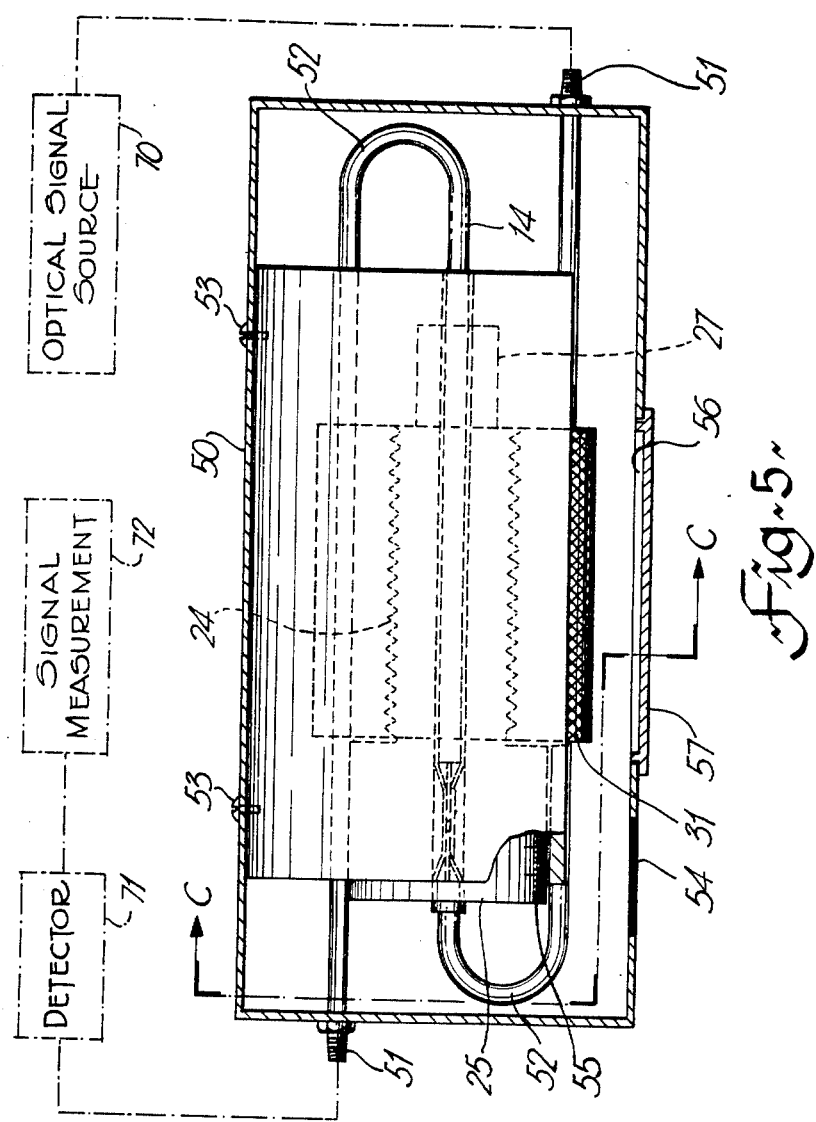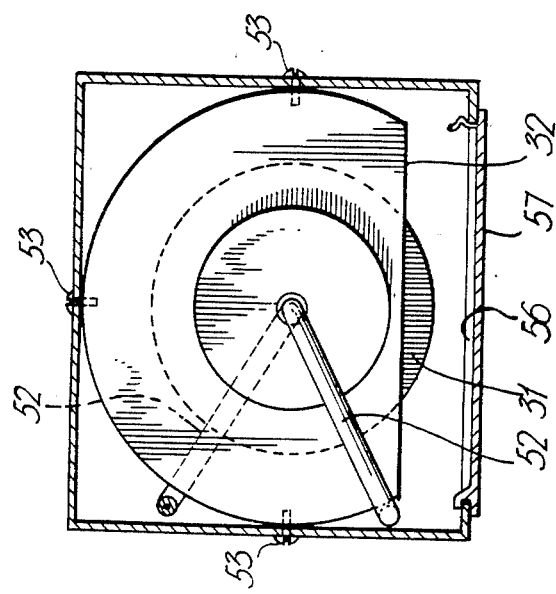

OPTICAL FIBRE CONNECTOR FOR VARIABLE SIGNAL ATTENUATION

This invention relates to connecting two optical fibres in end to end relationship and more particularly to connecting two optical fibres in end to end relationship with a predetermined amount of variable end separation for providing variable optical signal attenuation.

In the testing of fibre optic communication systems it is often necessary to insert a known amount of attenuation in the optical transmission path. Fixed attenuation has been realized by installing a splice element such as described in U.S. Pat. No. 3,972,585, such that the axial end separation between the fibres is a predetermined value to give the required attenuation. Such an approach means that a new attenuator has to be made for each value of attenuation wanted.

An optical fibre is extremely fragile and positioning and holding must be done without damage to the fibres. An optical fibre usually comprises a light propagating core of one predetermined refractive index and having an outer cladding layer of a lower refractive index. The materials are usually glass. An alternative form has a separate outer layer, or cladding, but the fibre has a variable refractive index across its core, the index being higher at the fibre centre and lower at the outer circumference.

The fibre is covered with a flexible material as an example plastic, for protection and ease of handling.

The present invention provides the accurate end to end connection of optical fibres with a variable and separation by positioning the fibres in a tubular connecting member such as described in U.S. Pat. No. 3,972,585. Generally, one fibre is permanently held in the connecting member, as by crimping or bonding, and the other fibre is moved by a linear positioner which moves the fibre back and forth axially to increase and decrease the end separation of the two fibres, thus increasing and decreasing the attenuation.

Before being positioned in the connecting member, the ends of the fibres are stripped of the coatings and the end surfaces prepared to be smooth, flat and perpendicular to the axis of the fibre.

The invention will be readily understood by the following description of certain embodiments, by way of example, in conjunction with the accompanying drawings, in which:

FIG. 5 is a cross-section of an embodiment of the invention illustrating external connections;

FIG. 6 is a cross-section along the line C—C of FIG. 5;

Figure 1:
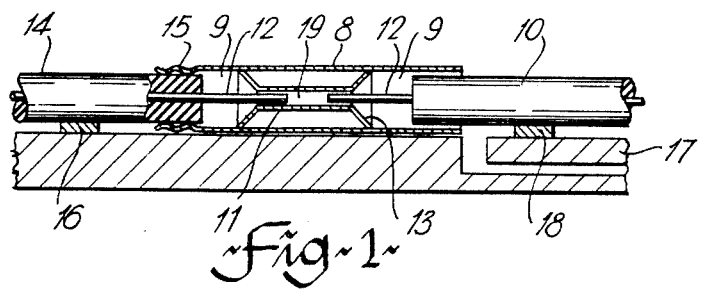
FIG. 1 illustrates the principal of the invention.

FIG. 1 illustrates the principal of the invention where the tubular connecting member 8 has at each end a bore 9 of close sliding fit over coated fibres 10 and 14 and a central bore 11 which is a close sliding fit on the opposed uncoated fibre ends 12. For ease of insertion of the uncoated fibre ends 12 an inclined surface 13 extends between the central bore 11 and the end bores 9. As an example the central bore 11 may be produced by a section which is preformed by deforming the walls of the member inwards to define the smaller central bore 11. Fibre 14 is stripped of its coating and placed into the tubular connecting member 8 and held in place by a crimp or bond 15, the fibre 14 may be supported by support member 16. Fibre 10 is stripped of its coating and supported on an axial positioner 17 by support member 18. The axial separation 19 of the fibre 14 and 10 is increased or decreased by moving the axial positioner 17 back and forth along the axis of fibre 10.

Figure 2:
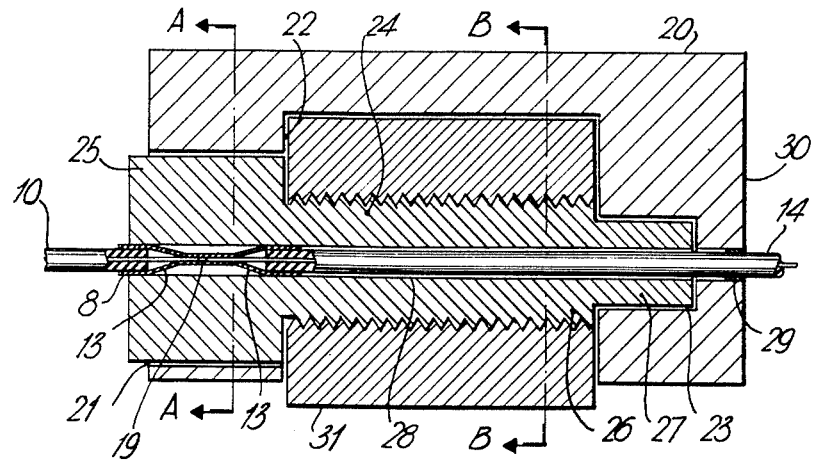
FIG. 2 is a cross-section of an embodiment of the invention showing zero separation.

FIG. 2 illustrates a housing 20 have a bore 21 for supporting section 25 of positioning member 24 and a bore 23 for supporting section 27 of positioning member 24. Housing member 20 has a hollowed portion 22 large enough to accept captive nut 31. The positioning member 24 is a basically cylindrical shape comprised of three sections. Section 25 is mounted in bore 21, section 26 has a reduced diameter and is threaded to accept captive nut 31, and section 27 has a further reduced diameter and is mounted in bore 23.

Positioning member 24 has an axial bore 28 therethrough of diameter sufficient to accept connecting element 8. A bore 29 of the same diameter as that of bore 28 is provided in the end wall 30 of housing 20 in order to allow fibre 14 to pass through.

Captive nut 31 may have a knurled surface to allow for easier rotation.

Figure 3:
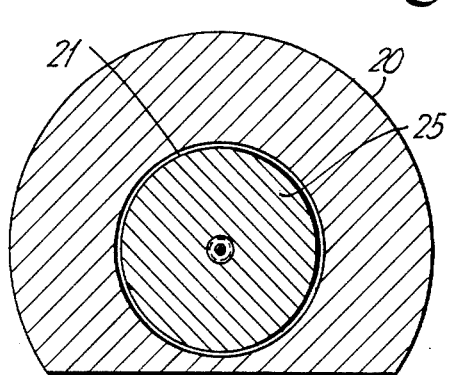
FIG. 3 is a cross-section along the line A—A of FIG. 2.

FIG. 3 is a cross-section along the line A—A of an embodiment as illustrated in FIG. 2. Housing member 20 has a generally circular cross-section with a cutoff section 32 to expose captive nut 21. Bore 23 supports section 25 of the positioning member 24 of FIG. 2. Connecting element 8 with fibre 10 is shown in position in the centre of section 25.

Figure 4:
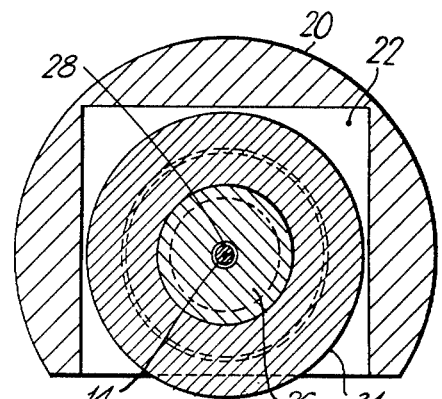
FIG. 4 is a cross-section along the line B—B of FIG. 2.

FIG. 4 is a cross-section along the line B—B of FIG. 2 and illustrates the cross-sectional form of the hollowed section 22, and the captive nut 31. Fibre 14 is shown in the bore 28.

FIG. 5 illustrates an embodiment of the invention in which a containing member 50 surrounds a connector as illustrated in FIG. 2 for protection and ease of handling. Bulkhead optical connectors 51 are provided through the containing member 50 to allow for interconnection to the connector. The movement of the fibres during variation of the end separation is taken up at the bends in fibres 52. Mounting screws 53 are shown on top of housing member 20. Side 54 of the containing member 50 may be transparent in order that calibrations mark 55 may be seen from outside. A hand hole 56 is provided in side 54 for adjustment of the end separation of fibres 10 and 14 by rotating captive nut 31. A transparent or otherwise cover plate 57 may cover the hand hole when not in use.

FIG. 6 illustrates a cross-section of FIG. 5 at the line C—C. The containing member 50 supports housing member 20 at the mounting screws 53.

Figure 7:
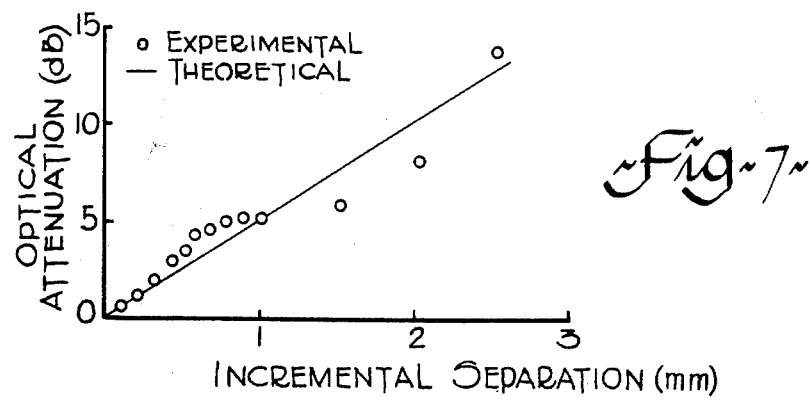
FIG. 7 is a graph of attenuation vs separation.

FIG. 7 shows a graph of the optical attenuation vs the incremental end separation of the fibres, experimental and theoretical. The splice element was prefilled with index matching fluid for this experiment but in practice may not be.

A method of measuring the attenuation is illustrated by the dotted boxes of FIG. 5. An optical signal source 70 is connected to one of the bulkhead optical connectors 51. The output optical signal from the attenuator is fed to an optical signal detector 71. The output from the signal detector 71 is processed by the signal measurement circuit 72. The separation of the fibre is varied from zero separation until the desired attenuation is achieved.

What is claimed is:

1. An optical fibre connector for variable optical signal attenuation comprising:

a connecting element with a common bore of size to fit two uncoated fibers in end to end relationship; said connecting element including two further bores, one on each end of said common bore, a first bore of a size to accept a first coated fiber with a close sliding fit and means for permanently securing said coated fiber to said connecting element, and a second bore of a size to accept a second coated fiber with a sliding fit to allow axial movement of said second fiber;

a moveable member, said second fiber secured therein and said positioning means in engagement with said moveable member; and a positioning means for varying the end separation of said optical fibres related to one another, said positioning means acting between said connecting element and said moveable member; and comprising a captive nut held in a fixed housing and mounted on a threaded portion of said moveable member.

* * * * *